US008162398B2

(12) United States Patent  
Colja et al.

(10) Patent No.: US 8,162,398 B2
(45) Date of Patent: Apr. 24, 2012

(54) ZONE LUMBAR MASSAGE SYSTEM

(75) Inventors: Renato Colja, Windsor (CA); Robert J. McMillen, Tecumseh (CA); John Koopman, Windsor (CA)

(73) Assignee: Schukra of North America Co., Tecumseh, Ontario (CA)

( * ) Notice: Subject to any disclaimer, the term of this patent is extended or adjusted under 35 U.S.C. 154(b) by 285 days.

(21) Appl. No.: 12/412,229

(22) Filed: Mar. 26, 2009

(65) Prior Publication Data

US 2010/0244504 A1 Sep. 30, 2010

(51) Int. Cl.
*A47C 3/00* (2006.01)
*A47C 7/02* (2006.01)

(52) U.S. Cl. .............. 297/284.4; 297/284.6; 297/452.42

(58) Field of Classification Search ............... 297/284.4, 297/284.5, 284.6, DIG. 3, DIG. 8, 452.42
See application file for complete search history.

(56) References Cited

U.S. PATENT DOCUMENTS

| 3,983,640 | A | | 10/1976 | Cardullo et al. |
| 4,629,253 | A | * | 12/1986 | Williams ................ 297/452.41 |
| 4,634,179 | A | | 1/1987 | Hashimoto et al. |
| 4,655,505 | A | | 4/1987 | Kashiwamura et al. |
| 4,707,027 | A | | 11/1987 | Horvath et al. |
| 4,981,131 | A | | 1/1991 | Hazard |
| 5,076,643 | A | | 12/1991 | Colasanti et al. |
| 5,135,282 | A | | 8/1992 | Pappers |
| 5,320,409 | A | | 6/1994 | Katoh et al. |
| 5,379,471 | A | | 1/1995 | Holdredge |
| 5,467,489 | A | * | 11/1995 | Cchen ................................ 5/720 |
| 5,509,155 | A | * | 4/1996 | Zigarac et al. ................. 5/655.3 |
| 5,558,398 | A | | 9/1996 | Santos |
| 5,678,891 | A | | 10/1997 | O'Neill et al. |
| 5,762,618 | A | | 6/1998 | Yamanaka et al. |
| 5,806,115 | A | * | 9/1998 | Brown .............................. 5/615 |
| 5,836,647 | A | | 11/1998 | Turman |
| 5,967,608 | A | | 10/1999 | Van Sickle |
| 6,074,006 | A | | 6/2000 | Milosic et al. |

(Continued)

FOREIGN PATENT DOCUMENTS

EP 1447070 8/2004

(Continued)

OTHER PUBLICATIONS

International Search Report and Written Opinion of the International Searching Authority, International Patent Application No. PCT/CA2010/000350, mailed Jun. 25, 2010.

*Primary Examiner* — Sarah B McPartlin

(74) *Attorney, Agent, or Firm* — Michael Best & Friedrich LLP

(57) ABSTRACT

A lumbar system for use in a seat includes a frame having a first side and a second side substantially opposite the first side, a pump mounted to the second side of the frame and operable to pressurize air, and a control module mounted to the second side of the frame. The control module is in communication with the pump to receive pressurized air. The lumbar system also includes a plurality of air cells mounted to the first side of the frame. Each of the plurality of air cells individually communicates with the control module to receive variable amounts of pressurized air provided by the pump such that each air cell is independently inflatable. The frame, the pump, the control module, and the plurality of air cells are installable in the seat as a single unit by coupling the frame to the seat.

37 Claims, 10 Drawing Sheets

U.S. PATENT DOCUMENTS

| | | |
|---|---|---|
| 6,088,643 A | 7/2000 | Long et al. |
| 6,098,000 A | 8/2000 | Long et al. |
| 6,203,105 B1 | 3/2001 | Rhodes, Jr. |
| 6,212,719 B1 | 4/2001 | Thomas et al. |
| 6,551,450 B1 | 4/2003 | Thomas et al. |
| 6,823,549 B1 * | 11/2004 | Hampton et al. ......... 5/713 |
| 6,916,300 B2 | 7/2005 | Hester et al. |
| 7,267,404 B2 * | 9/2007 | Kern et al. ......... 297/284.6 |
| 2003/0230917 A1 | 12/2003 | Dorfler et al. |
| 2004/0174056 A1 | 9/2004 | Gryp et al. |
| 2006/0049678 A1 | 3/2006 | Kern et al. |
| 2006/0217644 A1 | 9/2006 | Ozaki et al. |

FOREIGN PATENT DOCUMENTS

| | | |
|---|---|---|
| WO | 2007/121874 | 11/2007 |

\* cited by examiner

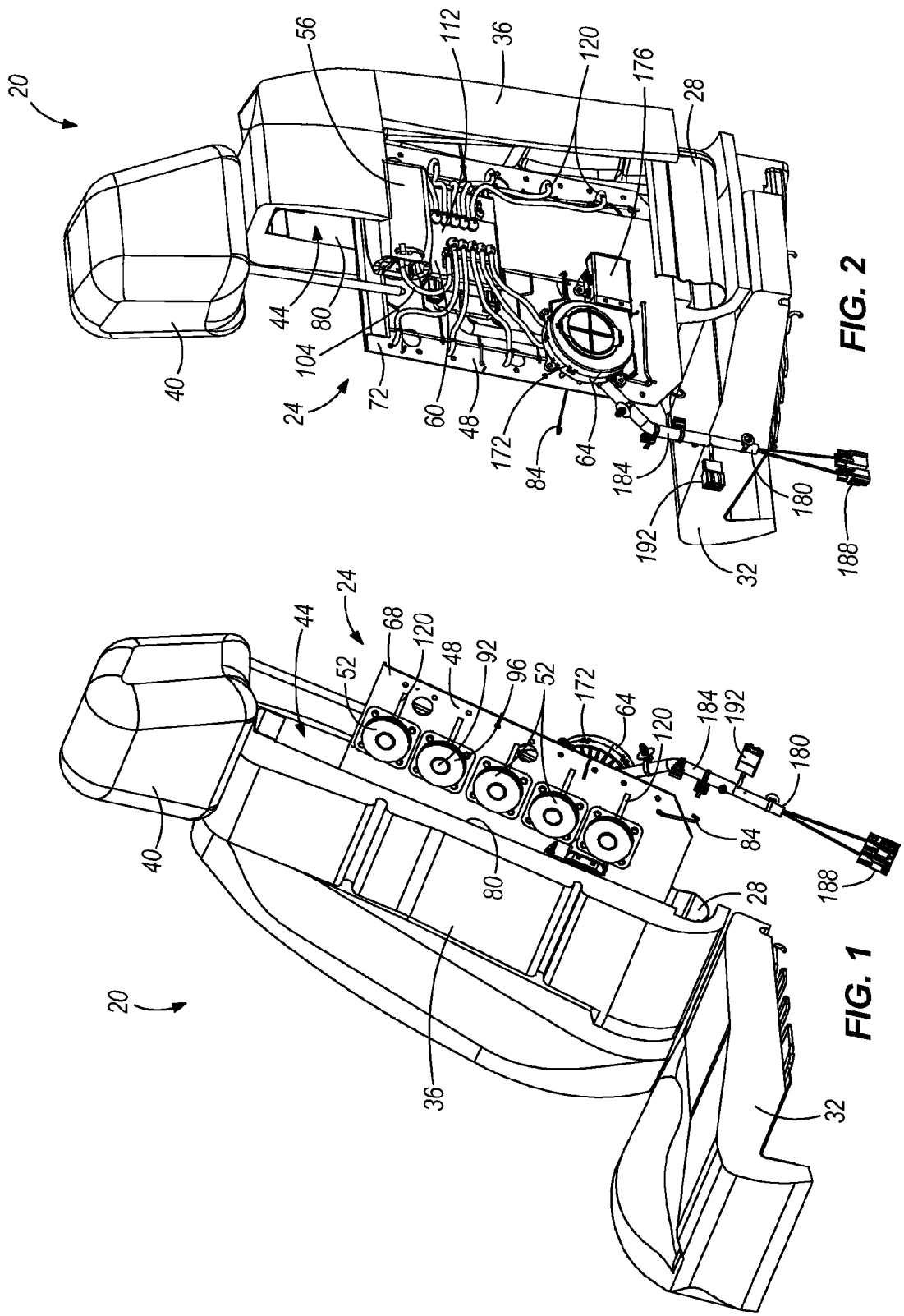

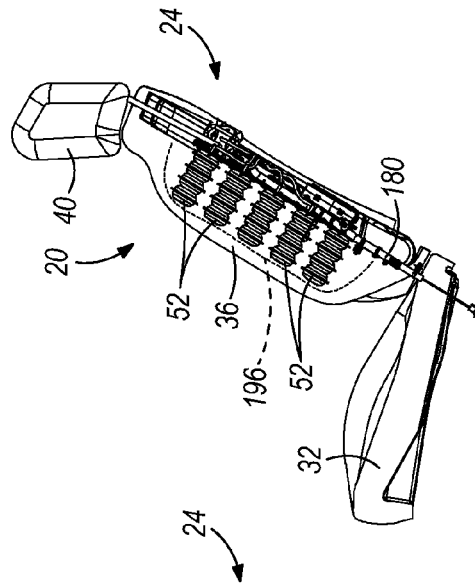
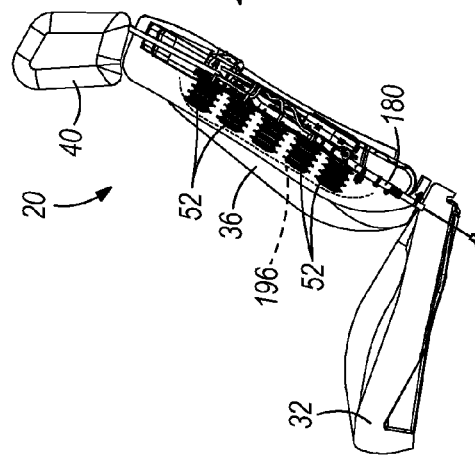
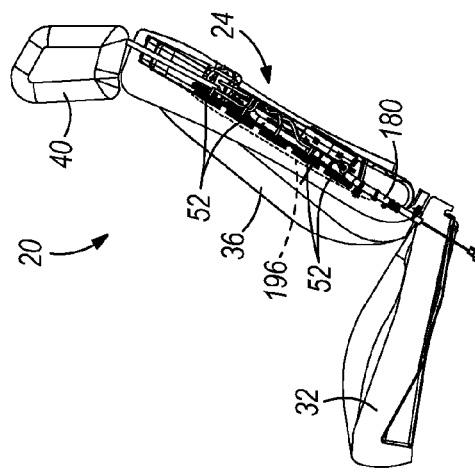
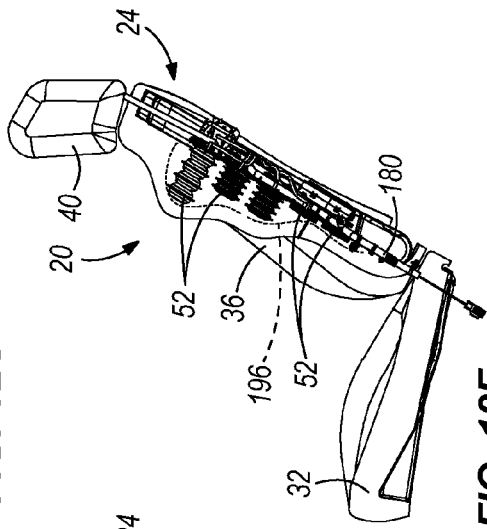
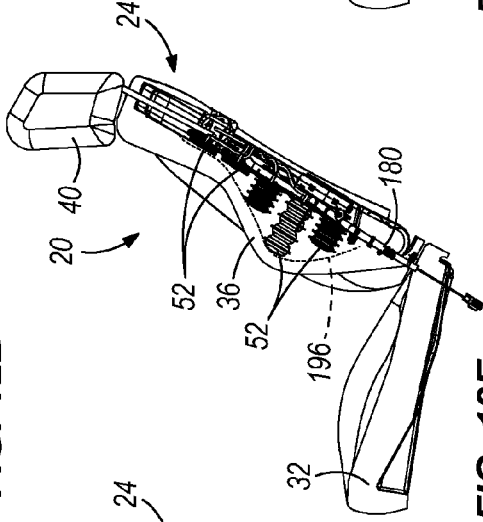
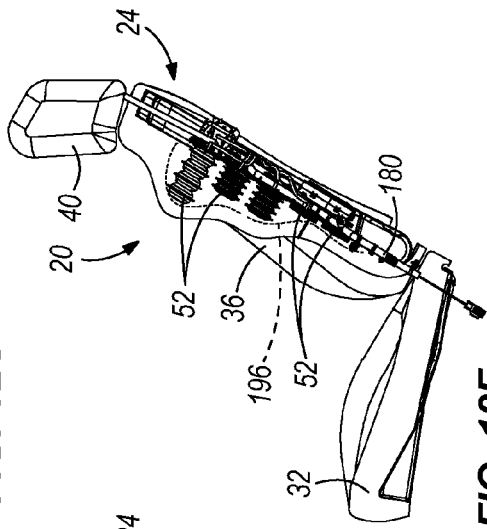
FIG. 12A   FIG. 12B   FIG. 12C
FIG. 12D   FIG. 12E   FIG. 12F

ZONE LUMBAR MASSAGE SYSTEM

BACKGROUND

The present invention relates to lumbar systems and, more particularly, to zone lumbar massage systems.

Mechanical, pneumatic, and vibration lumbar systems are used in seats (e.g., car seats, airplane seats, train seats, etc.) to increase comfort for seat occupants while sitting. However, such lumbar systems typically have limited variable motion control and, if the systems are designed to provide massaging effects, the massaging motions are usually in a symmetrical direction. In addition, existing lumbar systems typically do not allow seat occupants to vary the timing, speed, or direction of travel of the massaging motions.

Existing lumbar systems are also difficult to position within seats due to packaging constraints. Lumbar systems commonly include several separate components or parts that must each be individually positioned within the seats, increasing the cost of installation and reducing design flexibility.

SUMMARY

In one embodiment, a lumbar system for use in a seat includes a frame having a first side and a second side substantially opposite the first side, a pump mounted to the second side of the frame and operable to pressurize air, and a control module mounted to the second side of the frame. The control module is in communication with the pump to receive pressurized air. The lumbar system also includes a plurality of air cells mounted to the first side of the frame. Each of the plurality of air cells individually communicates with the control module to receive variable amounts of pressurized air provided by the pump such that each air cell is independently inflatable. The frame, the pump, the control module, and the plurality of air cells are installable in the seat as a single unit by coupling the frame to the seat.

In another embodiment, the lumbar system includes a frame installable within a portion of the seat, a pump operable to pressurize air, and a plurality of air cells mounted to the frame. Each air cell is operable to receive pressurized air from the pump and is infinitely adjustable between a deflated state and a fully inflated state. The lumbar system also includes a control module having a manifold in communication between the pump and the plurality of air cells. The control module is operable to independently and variably inflate each air cell in both a static support mode and a dynamic massage mode. The static support mode includes multiple static support positions.

In yet another embodiment, a seat includes a seat frame and a lumbar system. The lumbar system includes a lumbar frame having a first side and a second side substantially opposite the first side, a pump mounted to the second side of the lumbar frame and operable to pressurize air, and a plurality of air cells mounted to the first side of the lumbar frame. Each air cell is operable to receive variable amounts of pressurized air provided by the pump such that each air cell is independently inflatable. The seat also includes a control module mounted to the second side of the lumbar frame and having a manifold in communication between the pump and the plurality of air cells. The control module is operable to independently and variably inflate each air cell in both a static support mode and a dynamic massage mode. The static support mode includes multiple static support positions. The seat further includes a blower mounted to the lumbar frame to propel an air flow into a space between the first side of the frame and an outer surface of the seat. The lumbar frame, the pump, the control module, the plurality of air cells, and the blower are installed in the seat as a single unit by coupling the lumbar frame to the seat frame.

Other aspects of the invention will become apparent by consideration of the detailed description and accompanying drawings.

BRIEF DESCRIPTION OF THE DRAWINGS

FIG. 1 is a front perspective, partial sectional view of a seat including a zone lumbar system embodying the invention.

FIG. 2 is a rear perspective, partial sectional view of the seat and the zone lumbar system shown in FIG. 1.

FIGS. 12A-12F illustrate different inflation states of the zone lumbar system shown in FIG. 1.

DETAILED DESCRIPTION

Figure 3:
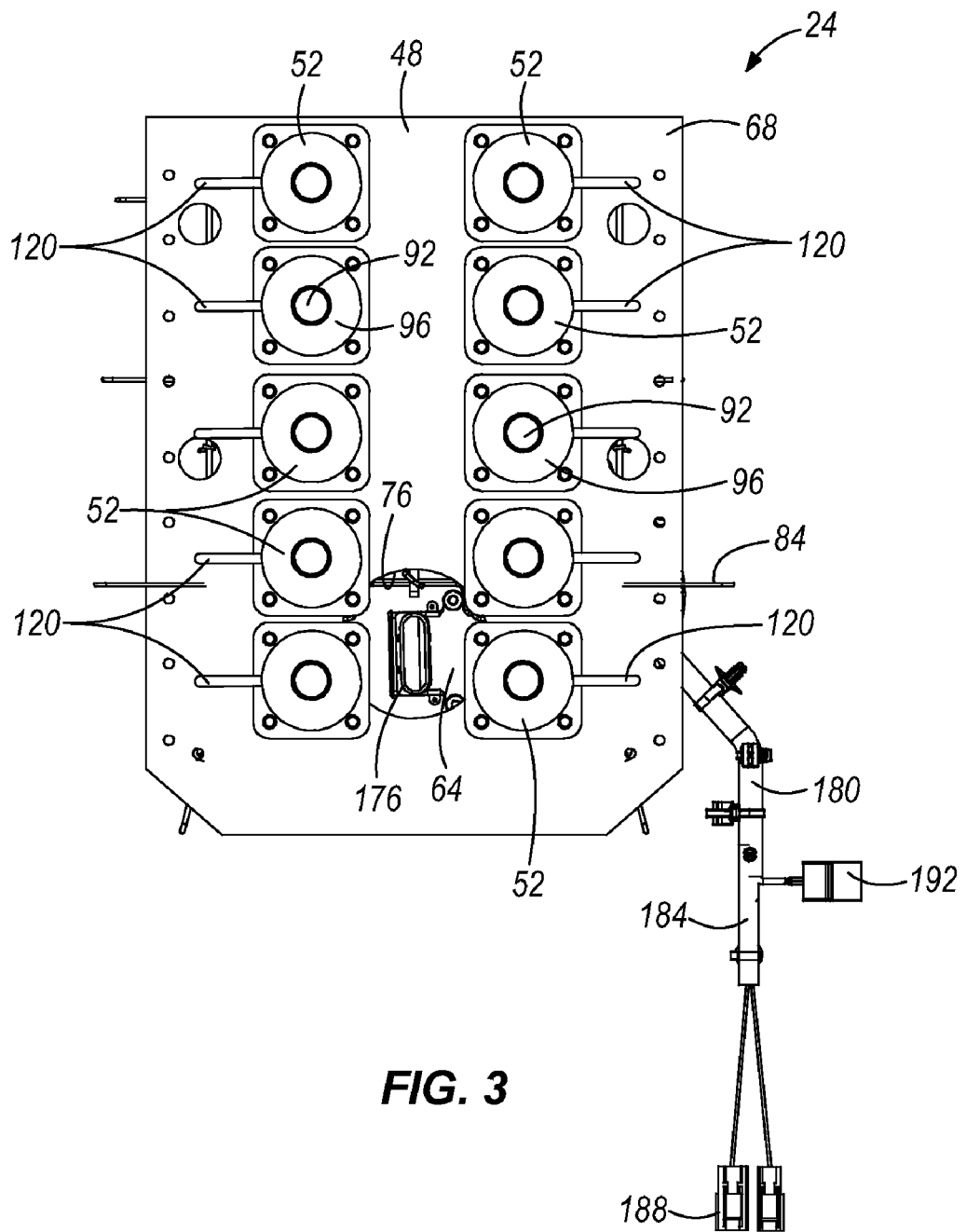
FIG. 3 is a front view of the zone lumbar system shown in FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting.

FIGS. 1 and 2 illustrate a seat 20 including a zone lumbar system 24 embodying the invention. In the illustrated embodiment, the seat 20 is a driver or passenger seat of an automobile and includes a frame 28, a bottom portion 32, a back support portion 36, and a head rest 40. In other embodiments, the seat 20 may be, for example, an airplane seat, a train seat, a home recliner, or the like. The lumbar system 24 is installed within a cavity 44 in the back support portion 36 to provide support to a seat occupant sitting in the seat 20. In some embodiments, another zone lumbar system may additionally or alternatively be positioned and installed within the bottom portion 32 of the seat 20.

The illustrated lumbar system 24 is a zone lumbar massage system operable to function in both a static support mode and in a dynamic massage mode. As shown in FIGS. 1-3, the lumbar system 24 includes a frame 48, a plurality of air cells 52, a pump 56, a control module 60, and a blower 64. The frame 48 is coupled to the seat 20 and includes a first side 68 that faces a seat occupant sitting in the seat 20 and a second side 72 that faces away from the seat occupant. In the illustrated embodiment, the frame 48, or mat, is a generally flat and solid substrate that may be composed of, for example, wood, metal, and/or a polymeric material. In other embodiments, the frame 48 may be a wire frame (see FIG. 13) or may be composed of a different material or combination of materials. The illustrated frame 48 is shaped and sized to fit within the cavity 44 in the back support portion 36 and provides a mounting location for the other components of the lumbar system 24. An opening 76, or air port, extends through the frame 48 from the first side 68 to the second side 72, and allows the blower 64 to provide an air flow between the first side 68 of the frame 48 and an outer surface 80 of the seat 20. The frame 48 also includes a suspension system 84 (e.g., wire hooks and/or support members) extending across and outwardly from the frame 48 to provide additional support to the frame 48 and to facilitate coupling the lumbar system 24 to the frame 28 of the seat 20.

The air cells 52 are mounted to the first side 68 of the lumbar frame 48 and face the outer surface 80 of the seat 20. The illustrated air cells 52 may be coupled to the frame 48 by, for example, rivets, staples, adhesives, VELCRO, tape, stitching, and/or loop and lock fasteners. Additionally or alternatively, the air cells 52 may be pocketed in foam that is coupled to the frame 48. In the illustrated embodiment, ten air cells 52 are coupled to the frame 48. In other embodiments, fewer or more air cells 52 may be coupled to the frame 48. In the embodiment shown in FIG. 3, the air cells 52 are generally symmetrically arranged in two columns along the first side 68 of the frame 48. In other embodiments, the air cells 52 may be arranged in other generally symmetrical patterns on the first side 68 of the frame 48 (see FIG. 14). In still other embodiments, the air cells 52 may be arranged asymmetrically or randomly on the first side 68 of the frame 48.

Figures 4, 7:
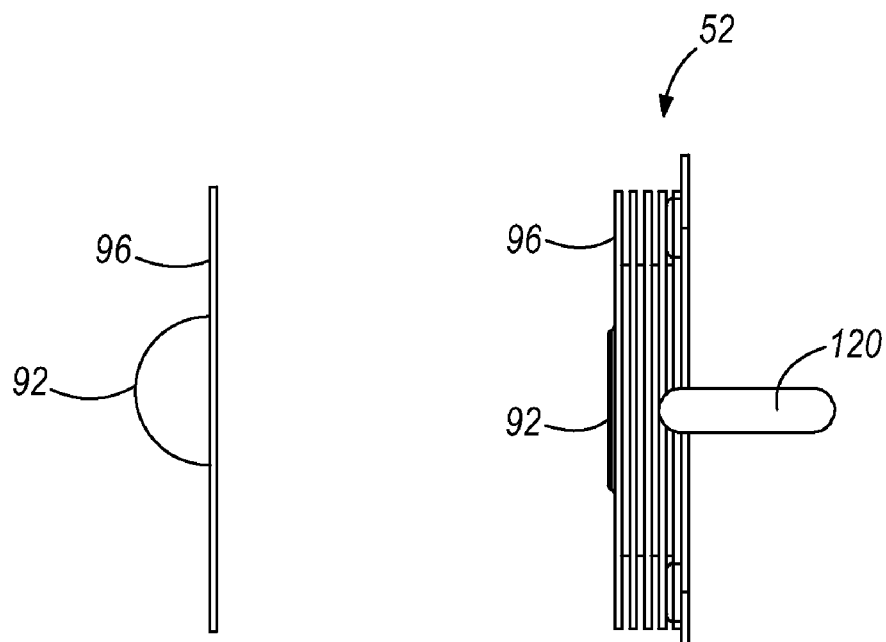
FIG. 4 is a side view of an air cell for use with the zone lumbar system of FIG. 1 in a deflated state.
FIG. 7 is a side view of a comfort button for use with the air cell of FIG. 5.
Figure 5:
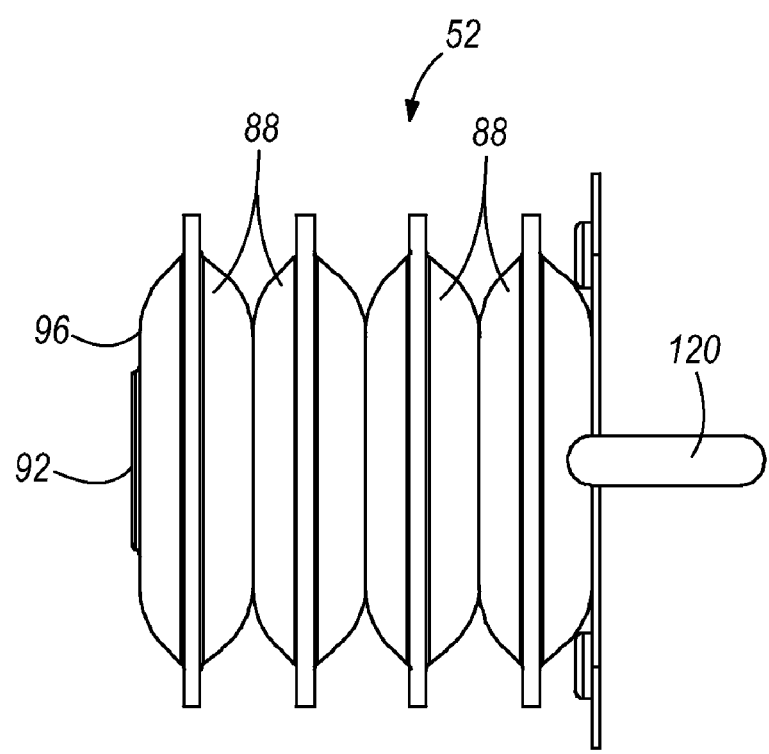
FIG. 5 is a side view of the air cell of FIG. 4 in a partially inflated state.
Figure 6:
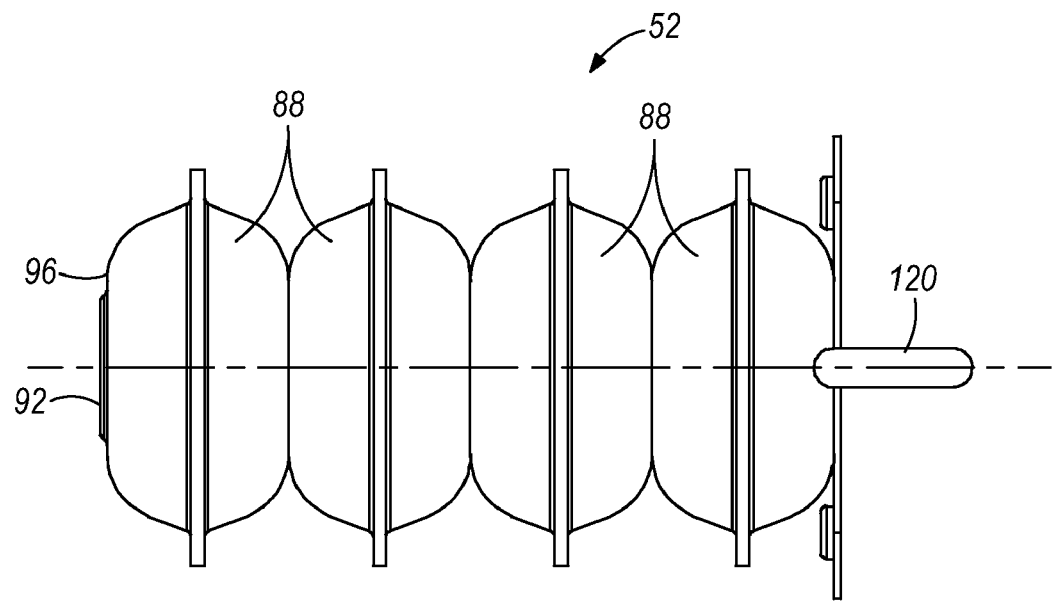
FIG. 6 is a side view of the air cell of FIG. 4 in a fully inflated state.

As shown in FIGS. 3-6, each air cell 52 is generally cylindrically shaped and includes a plurality of bladders 88. In other embodiments, the air cells 52 may be other shapes (e.g., cubical, pyramidal, conical, dog-bone, oblong, or the like) and/or each air cell 52 may have a different shape. The illustrated air cells 52 are inflatable from a fully deflated state (FIG. 4) to a fully inflated state (FIG. 6). The bladders 88 are in communication with one another and are variably inflatable to an infinite number of intermediate states or positions, such as the position shown in FIG. 5, in an accordion-like manner. As the air cells 52 inflate, the cells 52 extend generally perpendicularly in increasing amounts from the first side 68 of the frame 48 toward the outer surface 80 of the seat 20. The bladders 88 facilitate even inflation and deflation of the air cells 52 and improve the compactness of the air cells 52 when fully deflated (FIG. 4). In the illustrated embodiment, each air cell 52 includes four bladders 88. In other embodiments, each air cell 52 may include fewer or more bladders 88 such that the air cells 52 may extend away from the frame 48 by a greater or lesser amount.

Some or all of the illustrated air cells 52 may also include a comfort button 92 (FIG. 3) coupled to an end face 96 of the corresponding air cell 52. The comfort buttons 92 generally face a seat occupant sitting in the seat 20 and provide a soft pad at the end faces 96 of the cells 52. The illustrated comfort buttons 92 are generally hemi-spherically shaped and are composed of a relatively soft, compressible material such as, for example, foam. In other embodiments, the comfort buttons 92 may have, for example, generally cylindrical, pyramidal, or cubical shapes, or may be composed of a more rigid material to provide more localized pressure, particularly during massage operations. In some embodiments, such as the embodiment shown in FIG. 7, the comfort buttons 92 are variably inflatable with the air cells 52 between a fully deflated state (FIG. 5) and a fully inflated state (FIG. 7).

Figure 8:
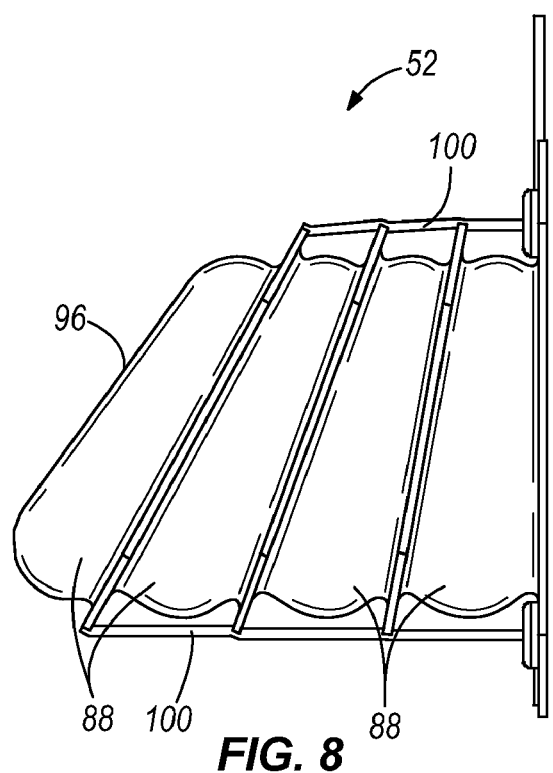
FIG. 8 is a side view of another embodiment of an air cell for use with the zone lumbar system of FIG. 1.

In some embodiments, such as the embodiments shown in FIG. 8, balancing straps 100 are coupled (e.g., stitched, glued, stapled, etc.) to one of the air cells 52 and to the frame 48. The balancing, or limiter, straps 100 control expansion of the corresponding air cell 52 as the cell 52 inflates from the deflated state to the fully inflated state. Although only one air cell 52 is illustrated with the balancing straps 100, it should be relatively apparent that the lumbar system 24 may include separate balancing straps 100 coupled to each air cell 52, to some of the air cells 52, or to none of the air cells 52. As shown in FIG. 8, the balancing straps 100 control expansion of the air cell 52 in a direction that is non-perpendicular and non-linear relative to the frame 48. In such embodiments, the end face 96 of the air cell 52 is non-parallel to the first side 68 of the frame 48 when the cell 52 is inflated, contouring at least a portion of the lumbar system 24 for a seat occupant sitting in the seat 20.

Figure 9:
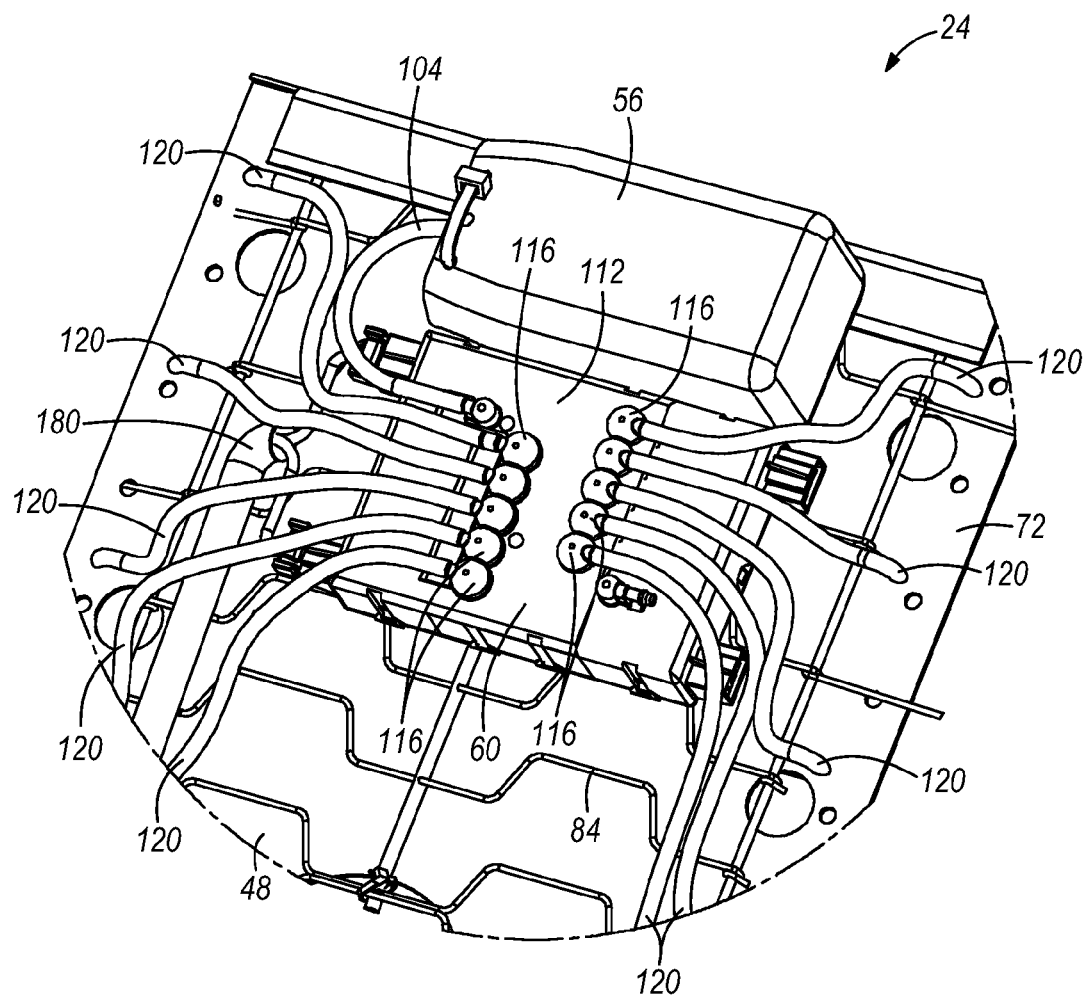
FIG. 9 is an enlarged rear perspective view of a portion of the zone lumbar system shown in FIG. 1.

As shown in FIGS. 2 and 9, the pump 56 is mounted to the second side 72 of the frame 48 adjacent to the control module 60, although the pump 56 could also be mounted to another portion of the frame 48 or seat 20 that is hidden from view of vehicle passengers. The illustrated pump 56 may be, for example, any suitable positive displacement pump, diaphragm pump, reciprocating pump, or the like that is operable to pressurize air. An air supply hose 104, or conduit, extends from the pump 56 and is in communication with the control module 60 to direct pressurized air from the pump 56 to the control module 60. A motor driver 108 (FIG. 10) of the control module 60 supplies power to and controls the pump 56 to activate and deactivate the pump 56 as needed.

The illustrated control module 60 is also mounted to the second side 72 of the frame 48 adjacent to the pump 56, but could also be mounted to another portion of the frame 56 or seat 20 that is hidden from view of vehicle passengers. The control module 60 includes a manifold 112 to receive pressurized air from the pump 56 and a plurality of valves 116 (e.g., solenoid valves) coupled to the manifold 112. The illustrated valves 116 are coupled directly to the manifold 112 and are independently actuated (e.g., opened or closed) to independently inflate and/or deflate the corresponding air cell 52. In some embodiments, the control module 60 may include two separate valves 116 for each air cell 52 such that each valve 116 either inflates or deflates the corresponding cell 52. In still other embodiments, some air cells 52 may be fluidly linked such that multiple air cells 52 may be operated by the same valve or valves 116.

A plurality of air outlet conduits 120 extends from the valves 116 to direct pressurized air from the manifold 112 to each of the air cells 52 independently. In the illustrated embodiment, the conduits 120 are flexible hoses that are removably coupled to the air cells 52 and the control module 60. In other embodiments, the conduits 120 may be passageways that are integrally formed or molded into the frame 48. Additionally or alternatively, in some embodiments, a single air outlet conduit may extend from the manifold 112 and direct air to valves that are coupled directly to the air cells 52 (see FIG. 15).

Figure 10:
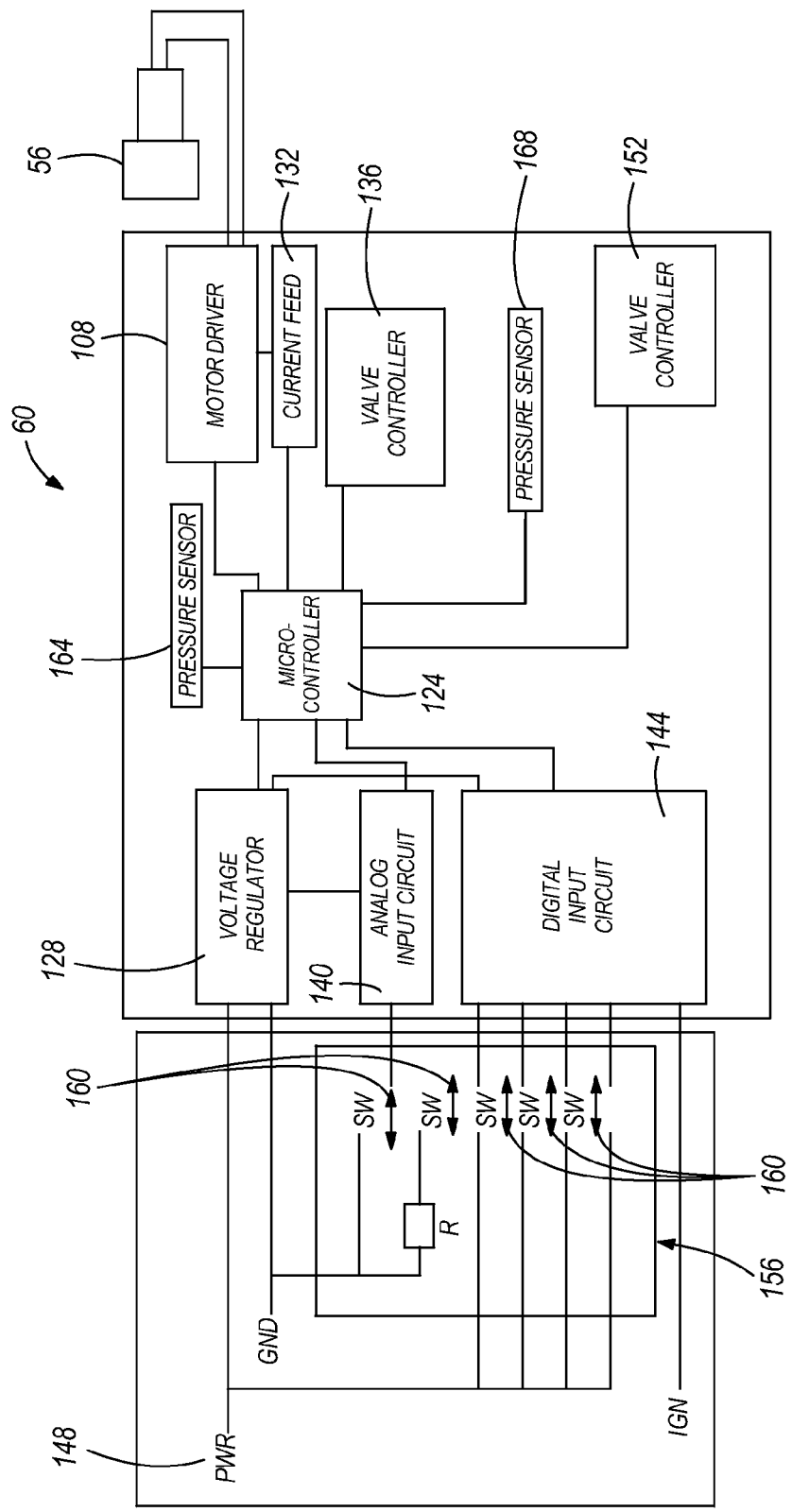
FIG. 10 is a schematic of a control module for use with the zone lumbar system shown in FIG. 1.

Referring to FIG. 10, the control module 60 includes a microcontroller 124, a voltage regulator 128, the motor driver 108, a current feed 132, a valve controller 136, an analog input circuit 140, and a digital input circuit 144. The microcontroller 124 sends and receives signals to and from the other components of the control module 60 to control operation of the lumbar system 24 and, in particular, inflation and deflation of the air cells 52. The voltage regulator 128 is electrically coupled to the microcontroller 124, the analog input circuit 140, and the digital input circuit 144. The regulator 128 helps maintain a constant or appropriate input voltage to the microcontroller 124 and the circuits 140, 144 from a power supply 148 (e.g., a car battery or alternator).

The current feed 132 is electrically coupled to the microcontroller 124 and the motor driver 108. The current feed 132 regulates power to the pump 56 through the motor driver 108 such that the driver 108 powers (e.g., turns on) the pump 56 on as desired.

The valve controller 136 is electrically coupled to the microcontroller 124 and the valves 116 (FIG. 9). The controller 136 controls actuation of the valves 116 between an open position and a closed position to help inflate, deflate, or maintain the air pressure within the cells 52. In embodiments where the valves 116 are actuatable to multiple positions (e.g., three-way valves), the valve controller 136 may independently control the actuation of the valves 116 to each position. In the illustrated embodiment, the control module 60 includes a second valve controller 152 to control the actuation of valves on a remote or second lumbar system (e.g., valves located on a lumbar system in the bottom portion 32 of the seat 20). The second valve controller 152 allows multiple lumbar systems within the seat 20 to be controlled and regulated by a single control module.

The analog and digital input circuits 140, 144 are electrically coupled to the microcontroller 124 and receive input signals from an operator control 156. The operator control 156 is an external device that is mounted to the seat 20, a dashboard, or another vehicle panel and includes a plurality of switches 160 that are actuatable by a seat occupant using the seat 20. The switches 160 adjust the current settings of the zone lumbar system 24 to change between the static support mode and the dynamic massage mode. The switches 160 also allow the seat occupant to make many changes to the lumbar system 24 while in either mode. For example, when in the support mode, the seat occupant can actuate one or more of the switches 160 to adjust the inflation amount in one or more of the air cells 52 in a particular zone (e.g., upper back, lower back, sides, etc.). Actuating one of the switches 160 can also change the current inflation states of the air cells 52 to a preset or saved static support position. When in the massage mode, the seat occupant can actuate one or more of the switches 160 to adjust the speed of the massaging motion, the timing of the massaging motion, the direction of the massaging motion, or the like. Actuating one of the switches 160 can also freeze (i.e., stop) the massaging motion at a static position that the seat occupant finds particularly comfortable.

As shown in FIG. 10, the illustrated control module 60 further includes two pressure sensors 164, 168. The pressure sensors 164, 168 are electrically connected to the microcontroller 124 and monitor air pressure within the lumbar system 24. In some embodiments, each pressure sensor 164, 168 may monitor the pressure within one particular air cell 52 or group of air cells 52. During normal operation, the air pressure provides an indication of the amount of inflation of the air cells 52. The pressure sensors 164, 168 may therefore help set the inflation amount of the air cells 52 at each of the various static support positions and during the dynamic massage motions. For example, if the pressure exceeds a predetermined threshold, the microcontroller 124 can activate a relief valve to relieve pressure from the cell 52 or group of cells 52. In addition, the pressure sensors 164, 168 can notify the microcontroller 124 if the pressure in the cell 52 or group of cells 52 drops below the desired or programmed pressure level. The microcontroller 124 can then activate the pump 56 and the corresponding valve(s) 116 to increase the pressure within the cell(s) 52. In some embodiments, the control module 60 may include a separate pressure sensor for each air cell 52.

Referring back to FIG. 2, the blower 64 is mounted to the second side 72 of the frame 48 adjacent to the opening 76 (FIG. 3). Similar to the pump 56, the blower 64 is coupled to and controlled by the control module 60, but may alternatively be coupled directly to and controlled by the operator control 156 (FIG. 10). In some embodiments, the blower 64 may be omitted entirely. The illustrated blower 64 includes a housing 172, a fan (not shown) positioned within the housing 172, and a nozzle 176 coupled to the housing 172 in communication with the fan. The fan draws ambient air into the housing 172 and propels an air flow into the nozzle 176. The nozzle 176 directs the air flow through the opening 76 in the frame 48 toward the outer surface 80 of the seat 20. The air flow between the first side 68 of the frame 48 and the outer surface 80 ventilates the seat 20 for enhanced seat occupant comfort. In some embodiments, such as the illustrated embodiment, the blower 64 includes a heating element and/or a cooling element positioned in the housing 172 or the nozzle 176. The heating and cooling elements heat, cool, or otherwise condition the air flow as the fan propels the air flow out of the nozzle 176.

As shown in FIGS. 1-3, a wiring harness 180 is coupled to the control module 60 and extends outwardly from the lumbar frame 48. The wiring harness 180 provides a single point connection for the power supply 148 (FIG. 10) and the operator control 156 (FIG. 10) to electrically connect to the pump 56, the control module 60, and the blower 64. The illustrated wiring harness 180 includes a connector portion 184 that extends away from the frame 48. The connector portion 184 includes a first electrical connector 188 that connects to the power supply 148 and a second electrical connector 192 that connects to the operator control 156. The connectors 188, 192 are standard sized electrical plugs that removably couple to the power supply 148 and the controller 156 to facilitate installation of the lumbar system 24 in the seat 20.

Figure 11:
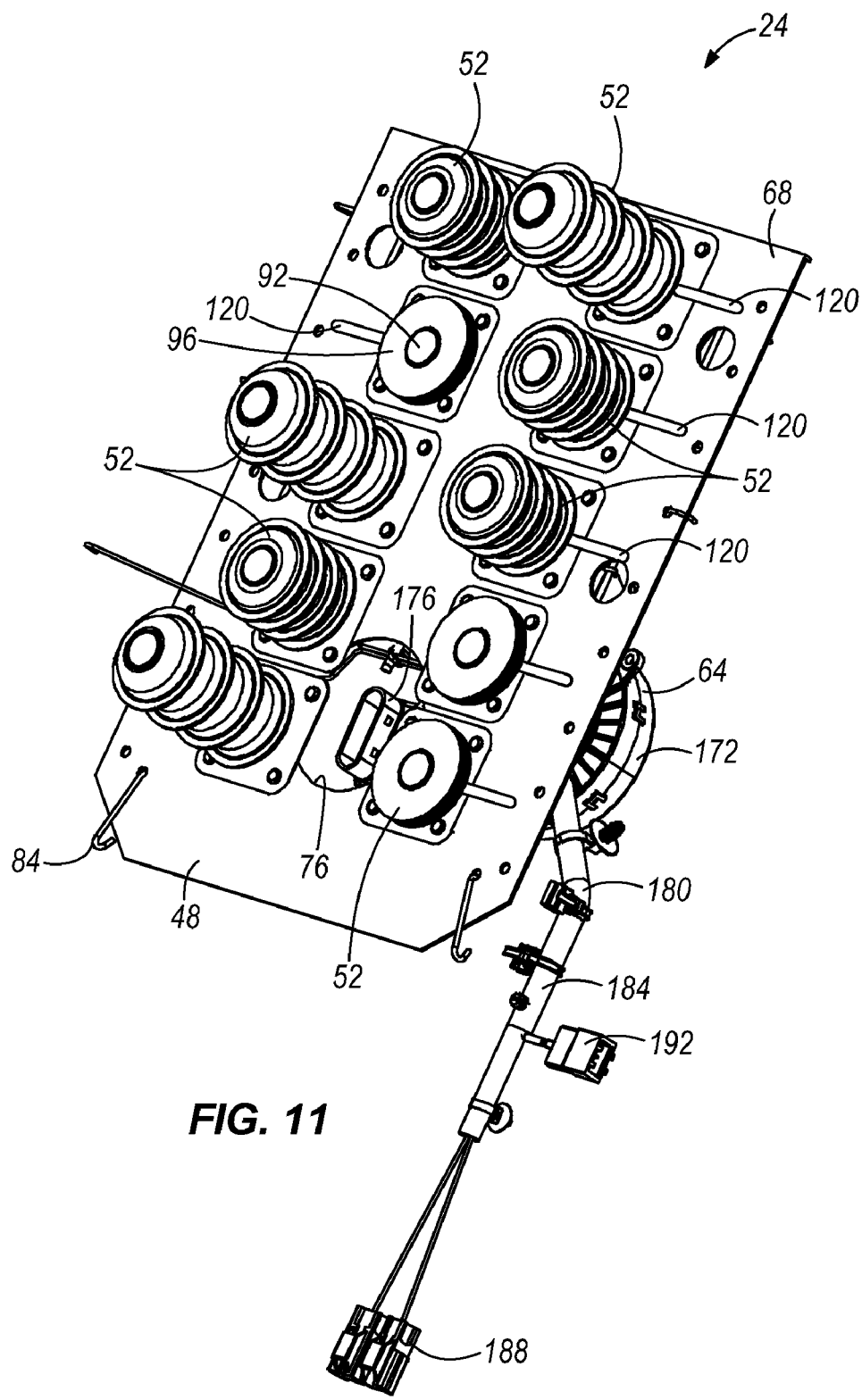
FIG. 11 is a front perspective view of the zone lumbar system shown in FIG. 1 including a plurality of air cells in different inflation states.

FIGS. 11-12F illustrate by way of example the zone lumbar system 24 in different operating positions. As shown in FIG. 11, each of the air cells 52 is independently inflatable to a variety of different states. Although the illustrated air cells 52 are only inflated to three different states (e.g., fully deflated, halfway inflated, and fully inflated), it should be readily apparent that the air cells 52 are inflatable to an infinite number of positions between the fully deflated state and the fully inflated state. As shown in FIGS. 12A-12F, the air cells 52 are inflated to various static support positions to provide support to particular areas or zones for a seat occupant. For example, the support position shown in FIG. 12D provides extra support to the lower back of the seat occupant, the support position shown in FIG. 12E provides extra support to the mid back of the seat occupant, and the support position shown in FIG. 12F provides extra support to the upper back of the seat occupant.

In addition, cycling through the static positions shown in FIGS. 12D-12F (and/or the static positions shown in FIGS. 12A-12C) in substantially any order provides different types of massaging motions or effects for a seat occupant. The massaging motions may occur in a preset pattern or may be relatively random. As discussed above, the operator control 156 (FIG. 10) allows the seat occupant to adjust the speed, timing, and direction of the massaging motions and even freeze the massaging motion at a comfortable static support position.

In some embodiments, such as the embodiment shown in FIGS. 12A-12F, the zone lumbar system 24 includes a flexible contour member 196. The flexible contour member 196 is coupled to the frame 48 and substantially covers the air cells 52. In the illustrated embodiment, the contour member 196 may be, for example, a fabric layer or a foam pad that stretches and deflects to generally match the current positions of the air cells 52. The contour member 196 evenly and smoothly distributes the support provided by the air cells 52 to the outer surface 80 of the seat 20 to reduce a seat occupant's perception of each individual air cell 52, thereby providing the sensation of a smooth area of support.

Figure 13:
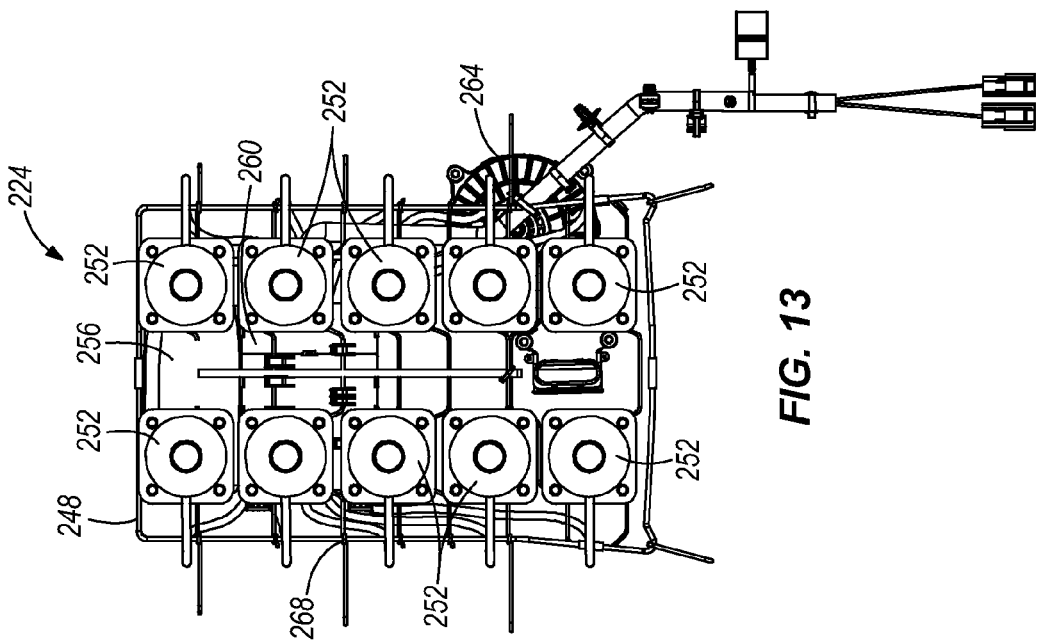
FIG. 13 is a front view of another embodiment of a zone lumbar system.

FIG. 13 illustrates a zone lumbar 224 system according to another embodiment of the invention. The illustrated lumbar system 224 is similar to the lumbar system 24 shown in FIGS. 1-12 and like parts have been given the same reference numbers plus 200. Reference is hereby made to the description of the features and elements, as well as alternatives to the features and elements, of the lumbar system 24 discussed above for description of the lumbar system features and elements not specifically discussed below.

The illustrated zone lumbar system 224 includes a frame 248, a plurality of air cells 252, a pump 256, a control module 260, and a blower 264. The air cells 252 are mounted to a first side 268 of the frame 248. The pump 256, the control module 260, and the blower 264 are mounted to a second side of the frame 248 substantially opposite the first side 268. In the illustrated embodiment, the frame 248 is a wire frame such that the air cells 252, the pump 256, the control module 260, and the blower 264 are mounted directly to wire cross members rather than to a substantially solid substrate. The wire frame 248 reduces the overall size and weight of the lumbar system 224. The wire frame 248 also facilitates running air conduits 320 between the air cells 252 and the control module 260 by not requiring clearance holes to be manufactured or formed in the frame 248.

Figure 14:
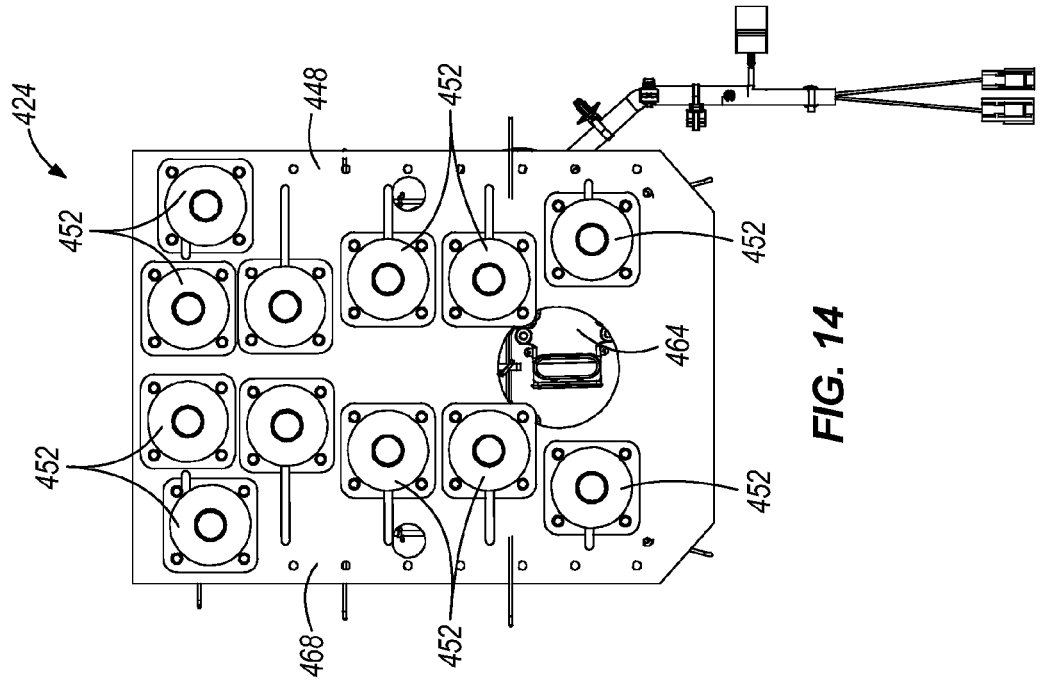
FIG. 14 is a front view of yet another embodiment of a zone lumbar system.

FIG. 14 illustrates a zone lumbar system 424 according to another embodiment of the invention. The illustrated lumbar system 424 is similar to the lumbar system 24 shown in FIGS. 1-12 and like parts have been given the same reference numbers plus 400. Reference is hereby made to the description of the features and elements, as well as alternatives to the features and elements, of the lumbar system 24 discussed above for description of the lumbar system features and elements not specifically discussed below.

The illustrated zone lumbar system 424 includes a frame 448, a plurality of air cells 452, a pump (not shown), a control module (not shown), and a blower 464. The air cells 452 are mounted to a first side 468 of the frame 448. The pump, the control module, and the blower 464 are mounted to a second side of the frame 448 substantially opposite the first side 468. In the illustrated embodiment, the lumbar system 424 includes twelve air cells 452 that are symmetrically arranged in a non-linear pattern on the frame 448. Similar to the lumbar system 24 discussed above, in other embodiments, the lumbar system 424 may alternatively include fewer or more air cells 452 that are symmetrically or asymmetrical arranged in other patterns on the first side 468 of the frame 448.

Figure 15:
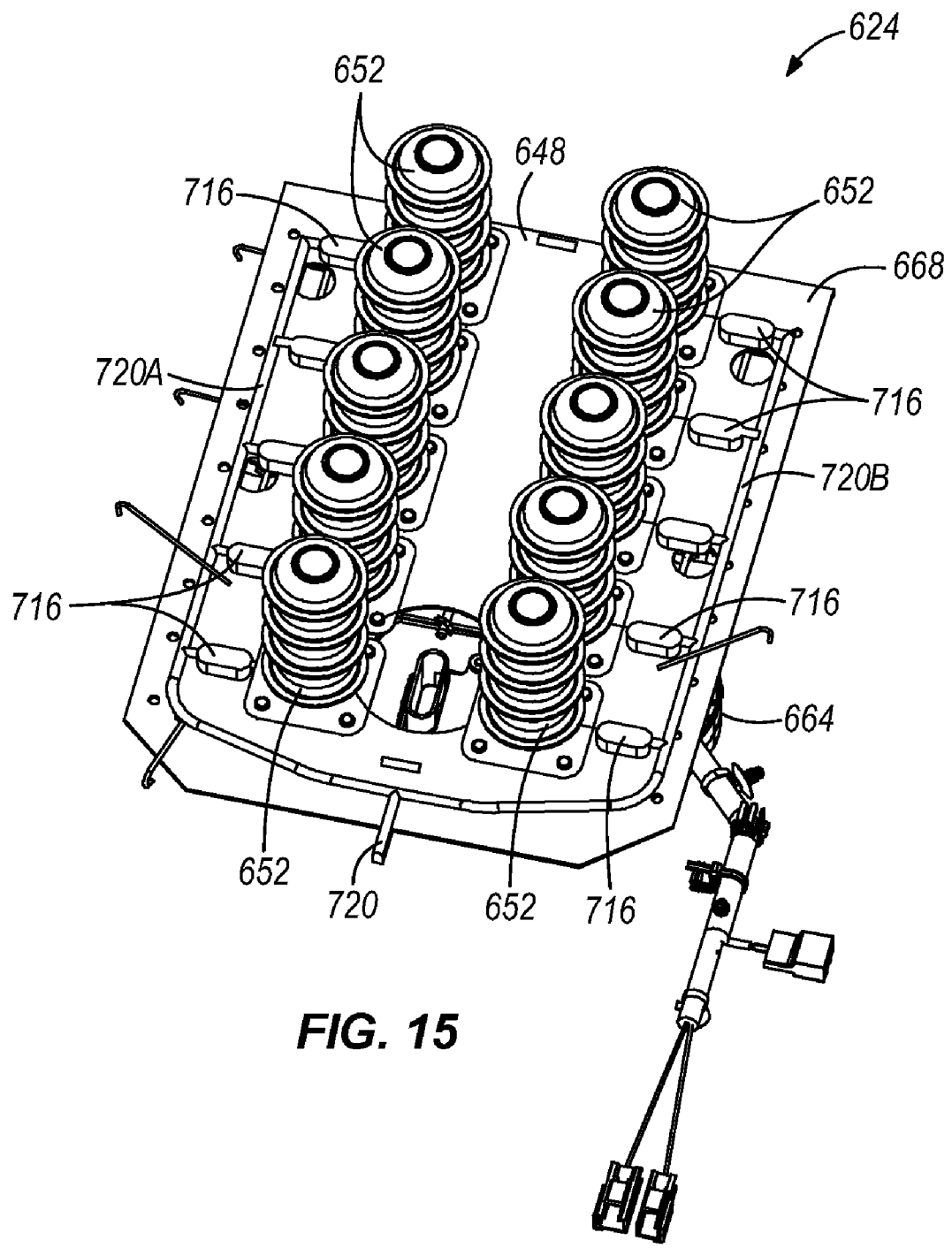
FIG. 15 is a front perspective view of still another embodiment of a zone lumbar system.

FIG. 15 illustrates a zone lumbar system 624 according to another embodiment of the invention. The illustrated lumbar system 624 is similar to the lumbar system 24 shown in FIGS. 1-12 and like parts have been given the same reference numbers plus 600. Reference is hereby made to the description of the features and elements, as well as alternatives to the features and elements, of the lumbar system 24 discussed above for description of the lumbar system features and elements not specifically discussed below.

The illustrated zone lumbar system 624 includes a frame 648, a plurality of air cells 652, a pump (not shown), a control module (not shown), and a blower 664. The air cells 652 are mounted to a first side 668 of the frame 648. The pump, the control module, and the blower 664 are mounted to a second side of the frame 648 substantially opposite the first side 668. In the illustrated embodiment, the control module includes a single air outlet conduit 720 that extends from a manifold of the control module toward the air cells 652. The outlet conduit 720 includes two branch conduits 720A, 720B that run substantially parallel to the air cells 652 positioned on the first side 668 of the frame 648. Valves 716 (e.g., solenoid valves) are mounted to the first side 668 of the frame 648 adjacent to each air cell 652. Each valve 716 regulates communication between one of the branches 720A, 720B and a corresponding air cell 652. Similar to the valves 116 discussed above, the illustrated valves 716 are independently actuatable to inflate and/or deflate the air cells 652. The illustrated lumbar system 624 includes ten valves 716 corresponding to the ten air cells 652. In other embodiments, the lumbar system 624 may include fewer or more valves 716 to match the number of air cells 652 mounted to the frame 648. Additionally or alternatively, the lumbar system 624 may include twice as many valves 716 as air cells 652 such that one valve is in communication with one of the air cells 652 to inflate the cell 652 and a second valve is in communication with the same air cell 652 to deflate the cell 652.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A lumbar system for use in a seat, the lumbar system comprising:
    an inflexible frame having a first side and a second side substantially opposite the first side;
    a pump mounted to the second side of the frame and operable to pressurize air;
    a control module in communication with the pump to receive pressurized air; and
    a plurality of air cells mounted to the first side of the frame, each of the plurality of air cells communicating with the control module to receive variable amounts of pressurized air provided by the pump such that each air cell is inflatable, wherein the pump, the control module, and the plurality of air cells are carried on the frame such that the frame, the pump, the control module, and the plurality of air cells are installable in the seat as a single unit.

2. The lumbar system of claim 1, wherein the control module includes a plurality of static support modes and at least one dynamic massage mode for directing the variable amounts of pressurized air to the plurality of air cells.

3. The lumbar system of claim 1, wherein each air cell is inflatable to at least one position between a deflated state and a fully inflated state.

4. The lumbar system of claim 3, wherein each air cell includes a plurality of air bladders to facilitate inflation between the deflated state and the fully inflated state.

5. The lumbar system of claim 1, wherein each air cell is generally cylindrically shaped and extends substantially perpendicularly away from the first side of the frame.

6. The lumbar system of claim 1, wherein at least one air cell includes a comfort button coupled to an end face of the at least one air cell.

7. The lumbar system of claim 1, further comprising a balance strap coupled to the frame and one of the plurality of air cells, wherein the balance strap controls expansion of the one of the plurality of air cells during inflation.

8. The lumbar system of claim 1, wherein the plurality of air cells is symmetrically arranged on the first side of the frame.

9. The lumbar system of claim 1, further comprising a flexible contour member coupled to the frame, wherein the flexible contour member covers at least a portion of the plurality of air cells.

10. The lumbar system of claim 1, wherein each of the plurality of air cells individually communicates with the control module to receive variable amounts of pressurized air provided by the pump such that each air cell is independently inflatable.

11. The lumbar system of claim 1, wherein the control module includes a manifold mounted to the frame and in communication with the pump, and a plurality of valves mounted to the frame and in communication between the manifold and the plurality of air cells, and wherein each valve is independently actuatable to adjust an inflation amount of at least one of the plurality of air cells.

12. The lumbar system of claim 1, further comprising a wiring harness electrically coupled to the pump and the control module, wherein the wiring harness includes only one connector portion that extends away from the frame, and wherein the only external electrical connections on the connector portion are a power supply and an operator control.

13. The lumbar system of claim 1, wherein the frame defines an opening extending from the first side to the second side, and further comprising a blower mounted to the second side of the frame to propel an air flow through the opening and into a space between the first side of the frame and an outer surface of the seat.

14. The lumbar system of claim 13, wherein the blower includes at least one of a heating element and a cooling element to condition the air flow.

15. The lumbar system of claim 1, wherein the control module is mounted to the second side of the frame, and wherein the frame, the pump, the control module, and the plurality of air cells are installable in the seat as a single unit by coupling only the frame to the seat.

16. The lumbar system of claim 1, wherein the control module is mounted to the second side of the frame.

17. The lumbar system of claim 1, wherein the frame, the pump, the control module, and the plurality of air cells are installable in the seat as a single unit by coupling only the frame to the seat.

18. A lumbar system for use in a seat, the lumbar system comprising:
an inflexible frame having a first side and a second side, the frame installable within a portion of the seat;
a pump mounted to the second side of the frame and operable to pressurize air;
a plurality of air cells mounted to the first side of the frame, each air cell operable to receive pressurized air from the pump and adjustable to at least one position between a deflated state and a fully inflated state; and
a control module including a manifold in communication between the pump and the plurality of air cells, the control module operable to variably inflate each air cell in both a static support mode and a dynamic massage mode, the static support mode including multiple static support positions.

19. The lumbar system of claim 18, wherein each air cell is generally cylindrically shaped and extends substantially perpendicularly away from the first side of the frame.

20. The lumbar system of claim 18, further comprising a balance strap coupled to the frame and one of the plurality of air cells, wherein the balance strap controls expansion of the one of the plurality of air cells during inflation.

21. The lumbar system of claim 18, wherein the plurality of air cells is symmetrically arranged on the frame.

22. The lumbar system of claim 18, further comprising a flexible contour member coupled to the frame, wherein the flexible contour member covers at least a portion of the plurality of air cells.

23. The lumbar system of claim 18, wherein the control module includes a plurality of valves in communication between the manifold and the plurality of air cells, wherein each valve is independently actuatable to control an amount of inflation of at least one of the plurality of air cells.

24. The lumbar system of claim 18, wherein the control module includes a controller and an operator control, and wherein the operator control is operable to instruct the controller to adjust the plurality of air cells to one of the multiple static support positions and to operate in the dynamic massage mode.

25. The lumbar system of claim 18, further comprising a blower mounted to the second side of the frame, wherein the blower is operable to propel an air flow through an opening in the frame and into a space between the first side of the frame and an outer surface of the seat.

26. The lumbar system of claim 25, wherein the blower includes at least one of a heating element and a cooling element to condition the air flow.

27. The lumbar system of claim 18, wherein the control module is mounted to the second side of the frame.

28. The lumbar system of claim 18, wherein the frame, the pump, the control module, and the plurality of air cells are installable in the seat as a single unit by coupling only the frame to the seat.

29. A seat comprising:
a seat frame; and
a lumbar system including
a lumbar frame having a first side and a second side substantially opposite the first side,
a pump mounted to the second side of the lumbar frame and operable to pressurize air,
a plurality of air cells mounted to the first side of the lumbar frame, each air cell operable to receive variable amounts of pressurized air provided by the pump such that each air cell is independently inflatable,
a control module mounted to the second side of the lumbar frame and including a manifold in communication between the pump and the plurality of air cells, the control module operable to independently and variably inflate each air cell in both a static support mode and a dynamic massage mode, the static support mode including multiple static support positions, and
a blower mounted to the lumbar frame to propel an air flow into a space between the first side of the frame and an outer surface of the seat,
wherein the lumbar frame, the pump, the control module, the plurality of air cells, and the blower are installed in the seat as a single unit by coupling only the lumbar frame to the seat frame.

30. The seat of claim 29, wherein each air cell is generally cylindrically shaped and extends substantially perpendicularly away from the first side of the lumbar frame.

31. The seat of claim 29, wherein the lumbar system further includes a balance strap coupled to the lumbar frame and one of the plurality of air cells, and wherein the balance strap controls expansion of the one of the plurality of air cells during inflation.

32. The seat of claim 29, wherein the lumbar system further includes a flexible contour member coupled to the lumbar frame, and wherein the flexible contour member covers at least a portion of the plurality of air cells.

33. A lumbar system for a seat, the lumbar system comprising:
 a frame having a first side and a second side opposite the first side;
 a pump mounted to the second side of the frame and configured to pressurize air;
 a control module mounted to the second side of the frame and in communication with the pump to receive pressurized air; and
 a plurality of air cells mounted to the first side of the frame, each of the plurality of air cells communicating with the control module to receive variable amounts of pressurized air provided by the pump such that each air cell is inflatable,
 wherein the frame, the pump, the control module, and the plurality of air cells are installable in the seat as a single unit by coupling only the frame to the seat.

34. The lumbar system of claim 33, wherein the frame, the pump, the control module, and the plurality of air cells are installable in the seat as a single unit by coupling only the frame to the seat.

35. The lumbar system of claim 33, wherein the control module includes a manifold mounted to the frame and in communication with the pump, and a plurality of valves mounted to the frame and in communication between the manifold and the plurality of air cells, and wherein each valve is independently actuatable to adjust an inflation amount of at least one of the plurality of air cells.

36. The lumbar system of claim 33, further comprising a blower mounted to the second side of the frame, the blower configured to propel an air flow through an opening in the frame and into a space between the first side of the frame and an outer surface of the seat.

37. The lumbar system of claim 33, further comprising a wiring harness electrically coupled to the pump and the control module, wherein the wiring harness includes only one connector portion that extends away from the frame, and wherein the only external electrical connections on the connector portion are a power supply and an operator control.

* * * * *